Jan. 3, 1967   W. MUHM   3,295,278
LAMINATED, LOAD-BEARING, HEAT-INSULATING STRUCTURAL ELEMENT
Filed April 3, 1963   2 Sheets-Sheet 1

INVENTOR.
WILHELM MUHM
BY
AGENT

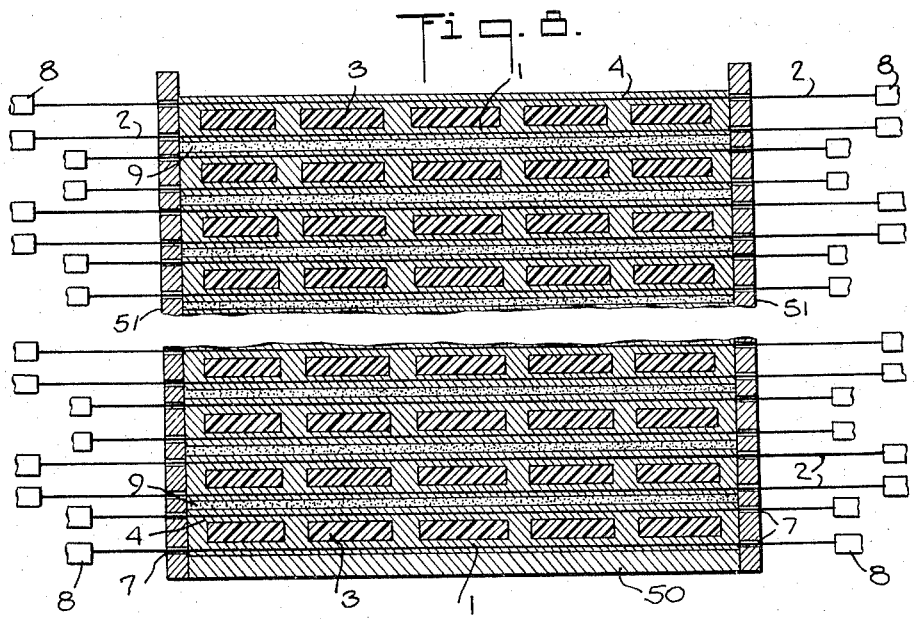
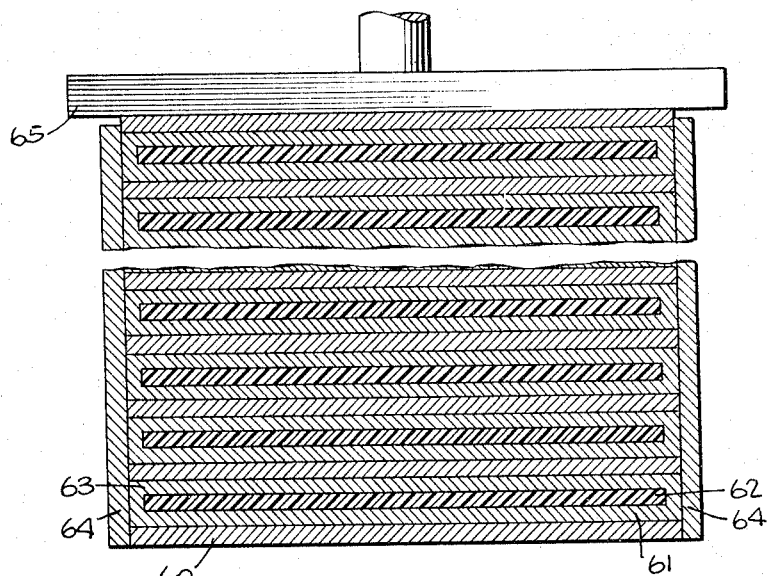

3,295,278
LAMINATED, LOAD-BEARING, HEAT-INSULATING STRUCTURAL ELEMENT
Wilhelm Muhm, Wiesbaden, Germany, assignor to Etablissement Plastitect, Vaduz, Liechtenstein, a corporation of Liechtenstein
Filed Apr. 3, 1963, Ser. No. 270,424
2 Claims. (Cl 52—223)

The present invention relates to improvements in structural elements and to their manufacture.

It is one object of this invention to provide new and improved structural elements which are heat-insulating while having the compression and tensile strength required for their use in a structure, for instance, in walls or roofs.

It is another object of the invention to provide structural elements of this type which are particularly useful and economical in the manufacture of prefabricated structures, such as one-story buildings, including houses and halls, etc.

It is also an object of the invention to provide structural elements of outstanding usefulness as lost concrete forms, i.e. concrete forms which remain as facing of the finished concrete wall.

The above and other objects of the present invention, together with its attendant advantages, are accomplished with a structural element of the indicated type, which consists of a heat-insulating plastic foam layer, at least one covering or facing layer of a reinforced aqueous binding material hardened to impart a compression and tensile strength to the element required for a structure wherein it is to be used, and mechanical means interlocking the layers into a unitary element.

The preferred heat-insulating layer material is polystyrene foam.

In one embodiment of this invention, the structural element consists of an intermediate plastic foam layer and two covering layers of hardened reinforced concrete facing opposite surfaces of the intermediate layer, a multiplicity of dowels extending between the concrete layers through bores in the plastic foam layer to interlock the layers mechanically. Preferably, the reinforced concrete layers are prestressed.

In another embodiment of the invention, the structural element consists of a plastic foam layer and at least one covering layer of a hardened mixture of an aqueous binder, such as cement, gypsum or plaster of Paris, or magnesite, and a reinforcement of wood fibers distributed randomly throughout the binder, adjacent surfaces of the layers being mechanically interlocked by a multiplicity of micro-dowels formed by the binder in surface crevices of the plastic foam layer.

Particularly if the wood fibers are of a wood high in resin content, it will be necessary to use a surface-active agent in the mixture to obtain a satisfactory distribution of the fibers throughout the layer. It may also be desirable to add to the mixture a plasticizing agent.

When plaster of Paris is used as the aqeous binder, manufacturing requirements may make it necessary to incorporate a retarding agent into the mixture to slow up the setting of the plaster of Paris.

To improve the adhesion of the plastic foam and covering layers to each other, it may be desirable to arrange a bonding film therebetween, useful bonding materials including swellable dry substances which become adhesive on swelling, for instance, cement, casein, polyvinyl alcohol, etc., or aqueous synthetic resin emulsions, such as polyvinyl acetate.

The characteristic feature of the structural element of the invention is its topography, as hereinabove set forth. The choice of materials, layer configuration and/or additional reinforcements will depend on economics and the static requirements of the building wherein the structural elements are to be used. Thus, while such plastic foams as foamed polyurethane or phenol-aldehyde polymers may be used, polystyrene foam sheets have been found most advantageous for the purposes of this invention.

The covering or facing layers or layers of the element are designed to impart to the element the desired and necessary resistance to stress so that the element may be loadbearing. Also, with the use of a wood fiber-aqueous binder facing layer, no further plastering is needed to finish a wall made of such elements.

According to the present invention, one embodiment of the structural elements is produced by casting freely flowable concrete onto a horizontal support, retaining the freely flowable concrete in a form to produce a layer, passing a plurality of elongated reinforcing wires through the concrete layer, stretching the wires while the concrete remains in plastic condition, placing a perforated plastic foam layer on the plastic concrete layer, casting another freely flowable concrete mass onto the plastic foam layer, some of the freely flowable concrete mass passing through the perforation in the plastic foam layer and into bonded relationship with the plastic concrete layer underlying the plastic foam layer, passing a plurality of elongated reinforcing wires through the concrete layer overlying the plastic foam layer, stretching the wires while the concrete thereof remains in plastic condition, permitting the concrete in both layers and in the plastic foam layer perforations to harden to form dowels interconnecting the two hardened concrete layers, and releasing the wires in the concrete layers to prestress the concrete.

Preferably, this procedure will be repeated by producing another element on top of the first element in the same manner, the two adjacent concrete layers of superposed elements being separated from each other by a suitable separating material, such as a layer of sawdust which may be impregnated with an anti-sticking agent for cement, such as traces of sulfite liquor.

Another embodiment of the structural elements of this invention may be produced by thoroughly mixing moist wood fibers and a dry binder becoming adhesive upon admixture with water, such as cement or gypsum, spreading the resultant mixture on a horizontal support to produce a layer of said mixture, placing a plastic foam layer on the first-named layer, pressing the layers together under sufficient pressure to permit some of the binder to enter crevices in the plastic foam layer surface and permitting the binder to harden so the layers become interlocked by a multiplicity of micro-dowels extending from the surface of the one into the adjacent surface of the other layer. If desired and preferably, another moist wood fiber-dry binder mixture is spread over the plastic foam layer to produce another such layer before the layers are pressed together and the binder is permitted to harden.

As in the above-described process, this procedure will preferably be repeated by producing another element on top of the first element, on a like horizontal support placed over the first element, a succession of such elements being superposed to form a stack and the stack of elements being pressed together simultanously.

The above and other features of the invention will be more fully described in connection with the following detailed description of certain preferred embodiments thereof, taken in conjunction with the accompanying drawing wherein FIG. 1 is a top view of a structural element according to one embodiment of the invention;

Figure 1:
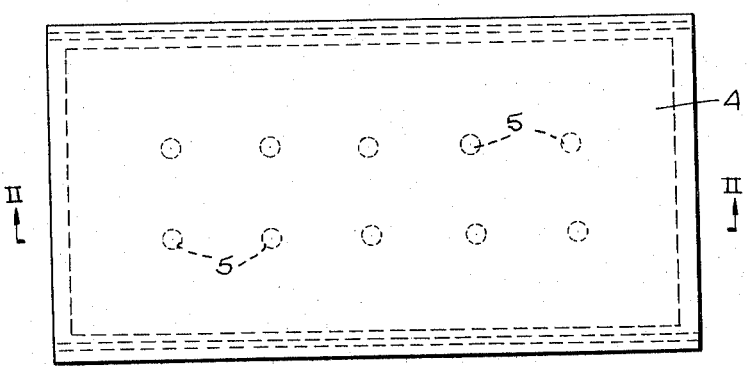
Figure 2:
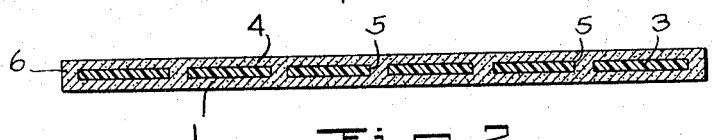
FIG. 2 is a transverse section of the element along line II—II of FIG. 1.

FIG. 8 schematically illustrates the production of the structural element of FIGS. 1 and 2; and FIG. 9 schematically illustrates the production of the structural elements of FIGS. 3 to 6.

Referring first to FIGS. 1 and 2, the structural element is shown as a plate consisting of two covering layers 1 and 4 and an intermediate layer 3 having a multiplicity of bores 5, the bores being filled with the concrete of the covering layers so as to form connecting dowels between the covering layers and passing through the intermediate layer.

As shown, the circumferential dimensions of the intermediate plastic foam layer 3 are smaller than that of the concrete layers 1 and 4 so that a concrete rim 6 surrounds the plastic foam layer on all sides and all surfaces of the element consist of concrete. This is important since plastic foam materials may constitute a fire hazard and it is preferred for this and other reasons to lose the plastic layer completely withing the element none of whose surfaces is made of plastic.

FIGS. 3 to 6 show variations of a structural element consisting of an intermediate plastic foam layer and two covering layers consisting of a hardened mixture of wood fibers and an aqueous binder, such as cement.

Figure 3:
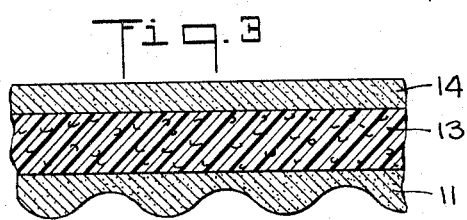
FIGS. 3 to 6 are transverse sections of modified forms of a structural element according to another embodiment of the invention.
Figure 7:
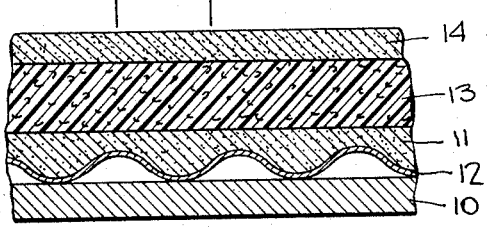
FIG. 7 illustrates a horizontal support useful in producing the structural element of FIG. 3.

In FIG. 3, the intermediate plastic foam layer 13 is faced by covering layers 11 and 14, the covering layer 11 having a corrugated outer surface desirable for some usages. Such corrugations may be produced very simply, as shown in FIG. 7, by placing a suitably corrugated form 12, for instance, of sheet metal, on the horizontal support 10 used for making the element, this support usually and most economically being of wood.

Figure 4:
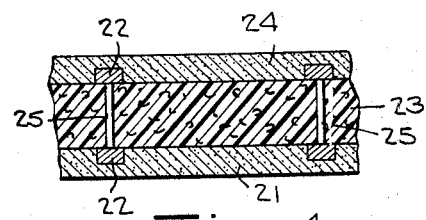

FIG. 4 shows a structural element of this general type wherein the covering layers are reinforced by elongated elements. The illustrated reinforcing elements are transversely arranged bars 22 of wood or other suitable material placed over the intermediate layer 23 and pairs of such reinforcing bars being held together with connecting wires 25 passing through the intermediate layer. When the reinforcing bars are embedded in the covering layer material and the same hardens thereabout, they will suitably reinforce these layers.

Figure 5:
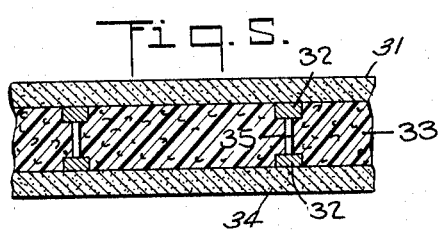
Figure 6:
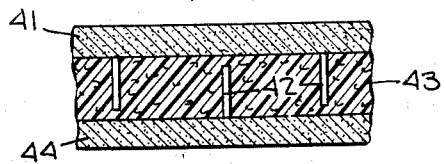

In the somewhat similar structural element of FIG. 5, elongated elements are arranged in the intermediate layer 33 to reinforce the same. As shown, these reinforcing elements may be transversely arranged wooden or like bars 32 embedded in corresponding grooves in the surfaces of the intermediate layer, pairs of associated bars being interconnected by wires 35. Covering layers 31 and 34 encase the plastic foam layer so that none of the surface of the finished element is made of plastic, a suitable rim of the covering layer material covering the lateral edges of the plastic foam layer. In the element of FIG. 6, the intermediate plastic foam layer 43 is reinforced by a plurality of dowels 42 extending into the layer 43 from the covering layers 41 and 44. These dowels are arranged in suitable holes or slots in the plastic foam layer and may take the form of pins, bars or sheets.

FIG. 8 illustrates an embodiment of the production of the laminated element of FIGS. 1 and 2. As shown, the elements are produced in a concrete form for instance, of wood, including a horizontal support 50 and side walls 51, 51 which may consist of boards. In the production of the elements, freely flowable concrete mix is first cast on the horizontal support to produce the lowermost concrete layer 1 of the first element. A plurality reinforcing wires 2 are passed through the concrete and through suitable bores 7 in the wide walls of the form between a pair of clamps 8, 8 which are moved apart from each other to stretch the wires while the concrete remains in a plastic condition, as is conventional in the manufacture of prestressed concrete. While the layer 1 is still plastic but no longer free flowing, the perforated plastic foam layer 3 is placed on the plastic concrete layer and another freely flowing concrete mass is poured over the layer 3. Some of the freely flowing concrete mass will pass through the perforations in the plastic foam layer and over the edges of the foam layer, which is smaller than the concrete layers, thus forming concrete dowels and rims bonding the two concrete layers together and fully embedding the plastic foam layer within concrete. A plurality of reinforcing wires 2 are passed through the upper concrete layer 4 in the same manner as described in connection with the prestressing of the lower layer 1 and stretched between a pair of clamps.

A second and, in practice, up to about 15 like structural elements are produced in the identical manner upon the same flat support by casting the lower concrete layer of succeeding, superposed elements over the top covering layer of the preceding element, two adjacent lower and top covering layers of adjacently superposed elements being separated from each other by spreading a layer 9 of sawdust therebetween. The sawdust may be impregnated with an anti-sticking agent for cement, such as traces of sulfite liquor, if desired. Each element is then produced in the indicated manner and after the concrete in all the elements has hardened, the stretched wires are released from the clamps to set a prestress into the finished concrete.

The concrete form has the width of the desired length of the structural elements and may have any desired length up to 300 feet or more for instance, the finished laminated slabs being cut into the desired sizes by a carborundum saw.

In the production of the structural elements illustrated in FIGS. 3 to 6, the following procedure may be followed in accordance with the invention:

A supply of wood fibers is prepared, the fibers preferably having a length of about 35 cm. to 50 cm., a width of about 1.5 mm. to 5 mm., preferably 2.5 to 3.5 mm., and a thickness of about 0.25 mm. to 0.40 mm., preferably about 0.35 mm. To avoid decay of the fibers, they are mineralized in a known manner with an alkaline liquor consisting of three parts by weight of calcium chloride and one part by weight of magnesium chloride of about 3° to 4° Bé. About 0.05%, by weight, of the alkaline liquor suffices for impregnation of the wood fibers so that the same will resist mildew and the like. Excess moisture is then removed from the mineralized wood fibers but sufficient water remains thereon to activate dry cement thoroughly mixed with the mineralized fibers in a subsequent operation immediately following the mineralization. Portland cement 375 has been used with success and this is mixed in a drum with the mineralized wood fibers so as to cover the fibers thoroughly and evenly with the cement.

Useful additions to this mixture include plastizers and/or surface-active agents. The plasticizer may consist of an aqueous emulsion or solution of sodium hydroxide and Vinsol resin, a hard, brittle, thermoplastic resin derived from pine wood, and containing phenol, aldehyde, and ether groups, produced by the Hercules Powder Co. The plasticizer consists of 932.7 parts of water, 8.6 parts of sodium hydroxide (24.85% concentration) and 67.3 parts of Vinsol resin, all parts by weight.

Another useful additive may be a mixture of a fully stable bitumen emulsion containing 0.5% of a surface-active agent, 3% to 10%, preferably about 5%, of a 50% bitumen emulsion being used, for instance.

About 1.5 to 3 parts by weight of the cement, preferably about 2 parts, are used per part of wood fibers in the mixture, the plasticizer and surface-active agents, if used, being added in an approximate proportion of 1% to 10% or 0.01% to 1.0%, respectively, based on the total mixture.

Alternatively, the cement binder is replaced by gypsum used in about the same proportion and thoroughly mixed with the mineralized and slightly moist wood fibers. A trace of a retarding agent is added to the mixture to prevent premature setting of the gypsum. "Retardan" produced by BASF is, for instance, useful for this purpose. (BASF=Badische Anilin- und Sodafabrik.)

The freshly prepared mixture is spread on a horizontal support which may be a flat board 60, as shown in FIG. 9, sufficient mixture being used to produce a covering layer 61 of the desired thickness, for instance 7.5 mm. Now, a plastic foam layer 62, which is preferably somewhat smaller in its circumferential dimensions but which may be, if desired, of about the same thickness as the covering layer, is placed upon the covering layer and finally another mass of the mixture is spread over the plastic foam layer to produce the top covering layer 63 usually of the same thickness as the first covering layer. The covering layer material is laterally retained by side walls 64 which permit material from the top layer to drop over the edges of the plastic foam layer so as to produce a rim of material fully enclosing the plastic foam layer and exposing none of it to the surface of the element. If desired, however, the top layer may be eliminated and a plastic foam layer may be laminated with a single facing layer.

After one laminated element has been prepared on the first horizontal support, another horizontal support 60 is placed on the top layer of the first element and the procedure is repeated until a stack of up to about 15 or more elements has been assembled. A pressure platen 65, which may be hydraulically or mechanically operated, is then applied to the stack of elements to compress the covering layers of the elements sufficiently to impart to them the desired strength. The pressure must not exceed one that will damage the plastic foam layers and, in the case of polystyrene foam, for instance, it will be below about 1.5 kg./sq. cm., for instance in the range of 1.2 kg./sq. cm. to 1.4 kg./sq. cm.

After the cement or gypsum has hardened, the compression is released and the structural elements may be trimmed to remove any wood fibers extending outwardly from the edges.

Drying or hardening may take up to about 24 hours in the ambient temperature but this time may be considerably reduced if drying is effected under heat.

If corrugation of a covering layer is desired, the horizontal supports may be modified in the manner illustrated in FIG. 7.

Also, the plastic foam layers may be provided with the various reinforcement shown in FIGS. 4–6, if desired, before they are placed into the hydraulic press, thus to increase the tensile and compression strength of the structural element. Furthermore, the plastic foam and/or the covering layers may be reinforced with fibers, webs, nets and other conventional reinforcing elements to increase the rigidity and/or the strength of the structural elements.

It may also be desirable to place a bonding material on the surface of the intermediate plastic layer, such as swellable substances which adhere on swelling, for instance, cement, caesin, polyvinyl alcohol, and emulsions of polyvinyl acetate, polyvinylchloride, polyacrylonitrile resins, etc., aqueous urea resin solutions in combination with polyvinyl acetate, epoxy resins, and like synthetic adhesives.

A useful bonding film between the wood fiber-cement covering layers and polystyrene foam layers is a 25%–75% aqueous solution, preferably a 50%, solution of polyvinylacetate which is brushed onto the surfaces of the polystyrene foam layers before they are placed into the press.

The structural elements of the present invention may be used for the construction of walls or roofs because they are load-bearing while being quite light and being very effective insulators. The plates with prestressed concrete and polystyrene layers have about three times the load-bearing strength of a light-weight concrete plate of the same thickness or a floor girder cement plate of double the thickness, with a 15 mm., cork insulating layer. If the wood fiber-cement mixture is used for the covering layers, the resultant elements have the same load-bearing and insulating strength as a lightweight concrete plate of six times their thickness. Both types of elements are much lighter than the conventional ones and insulate much better against sound and heat than comparative structural elements.

The following table gives comparative values:

| | Resistance to heat passage 1:1 | Thickness, mm. | Weight, kg./sq.m. |
|---|---|---|---|
| Prestressed concrete-polystyrene foam-prestressed concrete | 0.74 | 60 | 110 |
| Wood fiber-cement-polystyrene foam-wood fiber-cement | 0.74 | 30 | 7 |
| Light-weight concrete | 0.74 | 180 | 145 |
| Floor girder cement plate with 15 mm. cork layer or 10 mm. polystyrene foam layer | ¹ 0.74 | 130 | 115 |

¹ To obtain this degree of insulating power, the cork or foam layer is needed for insulation; otherwise and without it, the heat passage resistance is only 0.38.

The advantage of using polystyrene foam resides primarily in its great economy. For instance, a laminated structure of layers of equal thickness of polystyrene foam and a wooden fiber-cement mixture is cheaper than a pressed wood fiber-cement plate of the thickness of the laminate. A conventional 2" pressed plate of wood fiber-magnesite is more expensive than a three-layer structural element consisting of an intermediate layer of 1" polystyrene foam and two ½" covering layers of wood-fiber cement.

The structural elements with prestressed concrete covering layers are particularly useful as roofing plates. In this case, the outwardly facing covering layer need only be coated with tar and a fully heat-insulated and water-impermeable roof can be produced with these plates.

The plastic foam-fiberboard laminates are particularly useful as lost concrete forms for building walls. Such structural elements may be erected as a concrete form, filled with concrete and the outwardly facing covering layer of the elements requires no further plaster or other coating but may be painted immediately. This represents a great convenience and considerable savings in costs.

I claim:
1. A load-bearing, heat-insulating structural element consisting of a heat-insulating intermediate layer of plastic foam, two covering layers of prestressed concrete facing opposite surfaces of the intermediate layer and imparting a compression and tensile strength to the element required for a structure wherein it is used, and a pluraltiy of concrete connecting dowels passing through bores in the intermediate layer and integral with the covering layers to interlock the three layers into a unitary element.

2. A load-bearing, heat-insulating structural element consisting of a heat-insulating intermediate layer of polystyrene foam, two covering layers of prestressed concrete facing opposite surfaces of the intermediate layer and imparting a compression and tensile strength to the element required for a structure wherein it is used, and a plurality of concrete connecting dowels passing through bores in the intermediate layer and integral with the covering layers to interlock the three layers into a unitary element.

References Cited by the Examiner

UNITED STATES PATENTS

| 880,363 | 2/1908 | Costigan | 161—113 |
| 1,772,686 | 8/1930 | Kahr | 161—115 |

(Other references on following page)

UNITED STATES PATENTS

| | | | |
|---|---|---|---|
| 2,030,998 | 2/1936 | Mann | 52—220 |
| 2,159,300 | 5/1939 | Fashjian | 161—53 |
| 2,260,425 | 10/1941 | Widmayer | 52—324 |
| 2,410,022 | 10/1946 | Dumais | 52—612 |
| 2,421,721 | 6/1947 | Smith et al. | 52—612 |
| 2,649,135 | 8/1953 | Prase | 161—53 |
| 2,653,469 | 9/1953 | Callan | 52—274 |
| 2,691,292 | 10/1954 | Roberts | 52—125 |
| 2,702,424 | 2/1955 | Bakker | 264—228 |
| 2,826,521 | 3/1958 | Robinson | 161—57 |
| 2,868,008 | 1/1959 | Toulmin | 52—309 |
| 2,928,456 | 3/1960 | Potchen et al. | 161—160 |
| 3,000,144 | 9/1961 | Kitson | 52—309 |
| 3,001,333 | 9/1961 | Piana | 52—309 |
| 3,086,273 | 4/1963 | Welborn | 264—228 |

FOREIGN PATENTS 582,862  11/1946  Great Britain.

RICHARD W. COOKE, JR., *Primary Examiner.*

HENRY C. SUTHERLAND, FRANK L. ABBOTT,
*Examiners.*

M. O. WARNECKE, *Assistant Examiner.*